United States Patent [19]

Dreisin

[11] Patent Number: 4,685,874
[45] Date of Patent: Aug. 11, 1987

[54] METHOD OF AND APPARATUS FOR FORMING FILLED DOUGH PRODUCTS

[76] Inventor: Ilya Dreisin, 353 W. 57 St. #1257, New York, N.Y. 10019

[21] Appl. No.: 798,222

[22] Filed: Nov. 14, 1985

[51] Int. Cl.⁴ ............................................. A21C 3/00
[52] U.S. Cl. ................................... 425/132; 425/391; 425/561; 426/94; 426/500
[58] Field of Search ............... 17/33, 34; 99/450.1, 99/450.2, 450.6, 450.7; 425/130, 131.1, 132, 133.1, 391, 319, 296, 297, 302.1, 305.1, 283, 323, 324.1, 334, 557, 560, 561, 586; 426/94, 496, 500, 518, 503; 264/524, 534, 103, 167

[56] References Cited

U.S. PATENT DOCUMENTS

| | | | |
|---|---|---|---|
| 1,121,434 | 12/1914 | Westerman | 425/132 |
| 1,700,131 | 1/1929 | Hirsch | 17/34 |
| 1,711,750 | 5/1929 | Schoppner | 425/132 |
| 2,199,425 | 5/1940 | Waring | 264/103 |
| 3,060,495 | 10/1962 | Müller | 17/33 |
| 4,251,201 | 2/1981 | Krysiak | 425/132 |
| 4,624,030 | 11/1986 | Dreisin | 17/33 |

FOREIGN PATENT DOCUMENTS

| | | | |
|---|---|---|---|
| 59-183655 | 10/1984 | Japan | 425/319 |
| 683703 | 9/1979 | U.S.S.R. | 425/297 |

Primary Examiner—Jay H. Woo
Assistant Examiner—J. Fortenberry

[57] ABSTRACT

Apparatus for forming filled dough products comprising: piston extruders for pumping dough and filling to measuring devices which extrudes external dough tube with internal filling through a die head so that part of the dough tube of one item is extruded without filling, a twisting device for turning just extruded item around its longitudinal axis and twisting the empty part of the dough tube, and pinching device for forming closing and separating ends of the items.

5 Claims, 10 Drawing Figures

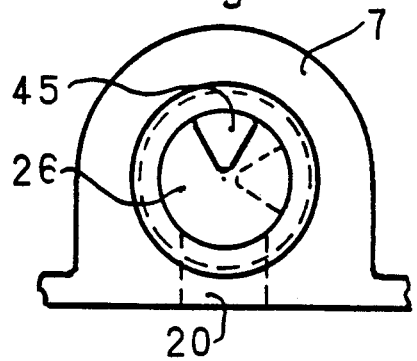
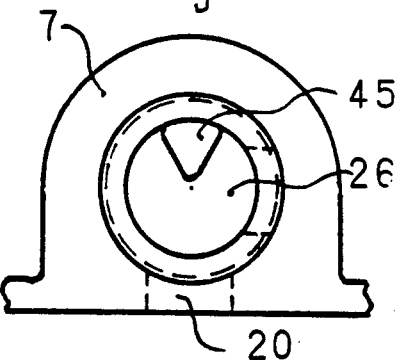
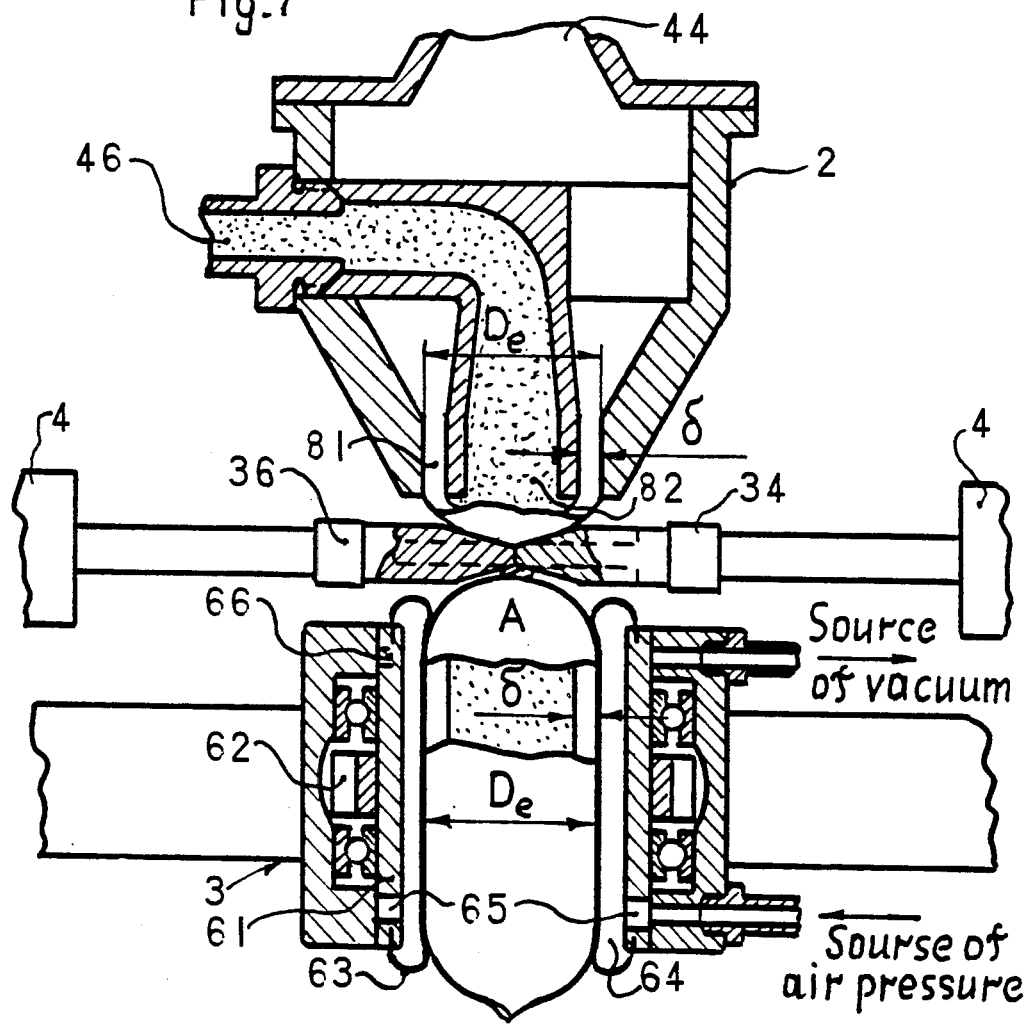

4,685,874

METHOD OF AND APPARATUS FOR FORMING FILLED DOUGH PRODUCTS

BACKGROUND OF THE INVENTION

The invention relates to a novel apparatus for intermitently forming filled dough items as a wonton, pirojhok and the like. Typically such products are made manually by wrapping a sheet of dough around a filling and the items thus made are cooked or fried for eventual consumption.

U.S. Pat. No. 4,259,051 discloses extrusion apparatus for food material which produces dough tube with filling such as ketchup or sour cream. U.S. Pat. No. 3,615,675 discloses an extruder that produces a dough tube filled with a suitable food material which is divided into pieces. U.S. Pat. No. 3,572,259 describes apparatus for molding dough materials with filling from bar shapes into spherical shapes. U.S. Pat. No. 3,541,946 discloses a device for forming a cereal shell and simultaneously filling the shell with a suitable filler. The continuous tube of cereal material is then divided into pieces.

These apparatuses have large dimensions and high cost.

OBJECTS AND SUMMARY OF THE INVENTION

It is an object of the present invention to provide a novel and improved apparatus for forming filled dough products. It is another object of the present invention to provide a small apparatus which is intended to be used by restaurants and similar businesses. These objects of the invention are obtained by providing an apparatus for forming filled dough products comprising means for extrusion predetermined quantity of external dough tube with internal filling so that a part of the external dough tube is extruded without filling; a twisting device for turning a just extruded dough tube with filling around its longitudinal axis and twisting it in a place without filling and a pinching device for closing ends of the adjacent items and separating of them.

BRIEF DESCRIPTION OF THE DRAWINGS

FIG. 5 is a view at arrow B, (FIG. 3) of the measuring device in a position "Taking a Dose".
FIG. 6 is a view at an arrow B (FIG. 3) of the measuring device in a position "Extruding a Dose".
FIG. 7 is a sectional view at a line II FIG. 1.

DESCRIPTION OF THE PREFERRED EMBODIMENT

Figure 1:
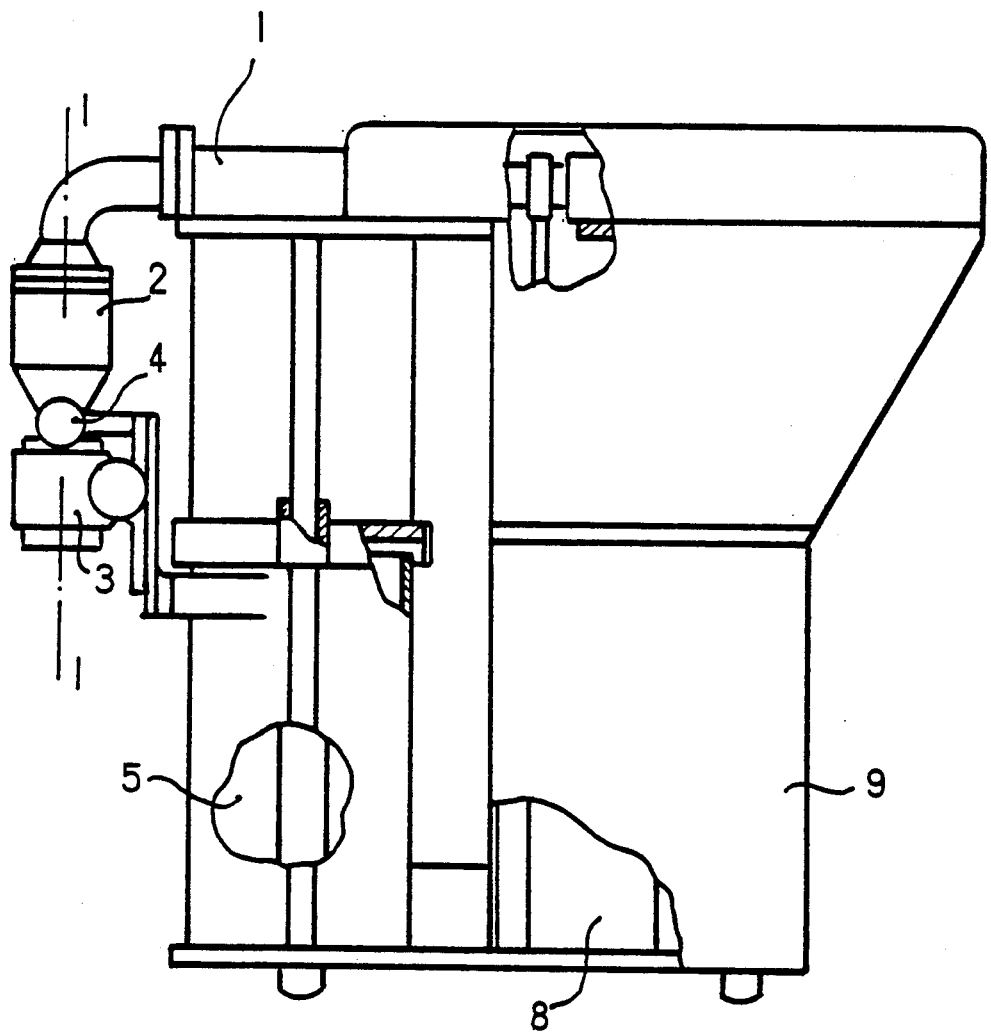
FIG. 1 is a principal side view of the apparatus.
Figure 2:
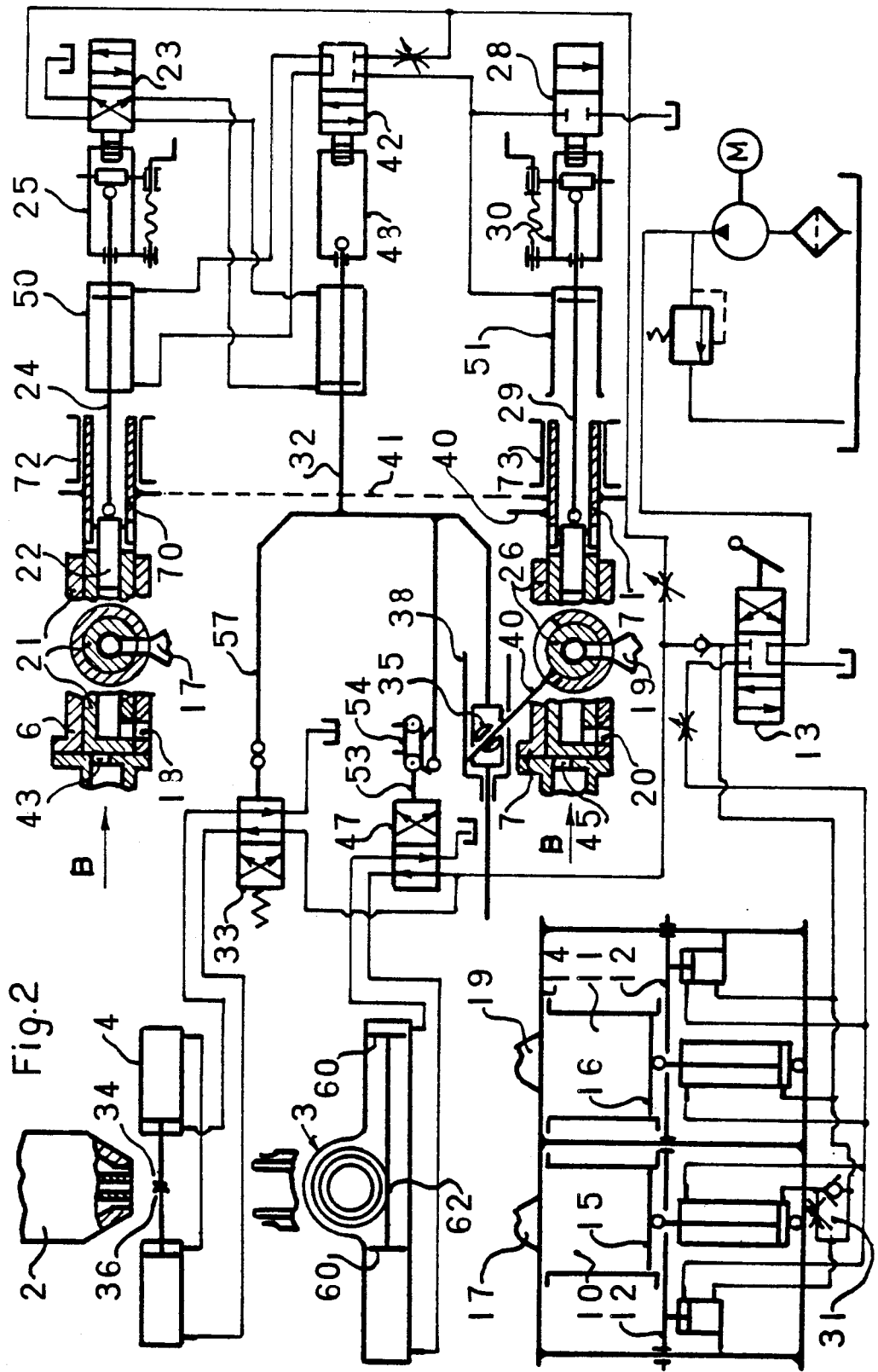
FIG. 2 is a diagram of the apparatus.

Referring to the drawings, reference number 1 indicates means for extruding an external dough tube with internal filling through die head 2. The apparatus of the present invention also includes: the twisting device 3, the pinching device 4, and the pumping device 5 which provides pumping dough and filling to the measuring devices 6 and 7 of the extrusion means 1. The apparatus has the hydraulic control system 8. All units are mounted on the body 9. The apparatus shown in FIG. 1 through FIG. 10 operates in the following manner: Easy replaceable product cylinders 10 with dough, and 11 with filling are put on the movable board 12 as shown on FIG. 2. Dough and filling are preliminarily vacuum-treated. The valve 13 is switched to the right position and replaceable product cylinders are squeezed between boards 12 and 14. Simultaneously product pistons 15 and 16 pump dough through the dough outlet 17 to the inlet 18 of the measuring device 6, and filling through the filling outlet 19 to the inlet 20 of the measuring device 7. It is understandable, that in another embodiment an apparatus can operate with any sources for pumping dough and filling to measuring devices 6 and 7. As it is shown on FIG. 2 filling fed to the rotary measuring cylinder 26 pushes the plunger 27 (FIG. 3) which switches the valve 28 in position shown on FIG. 2 by the rod 29 and the dose controller 30. The valve 31 provides the earlier feeding of the cylinder 26. Also dough fed to rotary measuring cylinder 21 pushes the plunger 22 which switches the valve 23 in the position shown on FIG. 2 by the rod 24 and the dose controller 25. In order to provide extrusion of the part of the dough tube without filling the dose controllers 25 and 30 are adjusted so that the working stroke of the rod 24 is always longer than the stroke of the rod 29. When the portion of dough for a next item has been completed in the meauring cylinder 21 and the valve 23 has been switched the rod 32 (FIGS. 2 and 4) is moved in the right position. The valve 33 is switched in the right position by its spring and cams 34 and 36 of the pinching device 4 are moved away. The crosshead 35 with the rocking bearing 37 is moved in the slide 38 which secured to the body 9 of the apparatus and turns the measuring cylinders 26 and 21 around its longitudinal axis from the position shown on FIGS. 2 and 5 to the position shown on FIG. 6 by the lever 40, chain transmission 41, tubular shafts 70 and 71 which are disposed in bearings 72 and 73. When the turn of the measuring cylinders 21 and 26 have been finished the rod 32 switches the valve 42 in the right position by frame 48. As a result plunger 22 pushes dough through the outlet 43 of the measuring cylinder 6 to the dough inlet 44 of the die head 2 and plunger 27 pushes filling through the outlet 45 of the cylinder 7 to the filling inlet 46 of the die head 2(FIGS. 2, 3, 6 and 7). The tubular outlet 81 which has thickness of the open area 8 of the die head 2 provides extrusion of dough tube. The outlet 82 of the die head 2 provides extrusion of filling. As it is shown on FIG. 2 a synchronization of a movement of the plungers 22 and 27 (simultaneous extrusion dough and filling) is provided by the hydraulic series connection of the hydraulic cylinders 50 and 51. When the portion of the filling for one item has been extruded the valve 28 is switched in the left position. This allows extruding the rest of the portion of the dough tube without filling. When the rest of the dough tube for one item has been extruded, the valve 23 is switched in the left position as a result the rod 32 moved in the left direction and turns the rotarty measuring cylinders in the position shown on FIG. 2. During its way the pawl 52 switches the hydraulic rotary spool directional control valve 47 in the other position by turn of its spool shaft 53 which has the chain transmission 54 with cams 55 on the chains (FIG. 4). The distance between two adjacent cams 55 equally half of the length of the pitch circle of the sprocket 56 which is secured to the spool shaft 53. When valve 47 is changed its position the pistons 60 of the hydraulic actuator of the twisting device 3 changes its position and rotor 61 is turned for predetermined angle by the rack-and-gear drive 62. On FIG. 7 the twisting device is shown during the rotating of the rotor 61. As it is shown on FIG. 7 the stretchable plastic tube 63 with its ends tightly fixed in the ends of the rotor 61 forms with the rotor 61 the tubular swelling member which has the inner space 64. If the air from the source of the air pressure is supplied into the inner space 64 the stretchable tube 63 is stretched and firmly and gently embraces the item A while the rand-and-gear-drive 62 turns the rotor 61 with embraced item about its axis. As a result the part of dough tube which was extruded without filling, is twisted for predetermined angle. It is possible in this embodiment of the apparatus because the part of dough tube without filling is self-vacuumed. More detailed description of the twisting device 3 is in my U.S. Pat. No. 462,4030. The advantage of this apparatus is that the source of air is connected with inner space 64 through openings 65, in any intermediate position of the pistons 60, but source of vacuum is connected with inner space 64 through opening 66 in two extreme positions of the pistons 60. In these positions the source of air pressure is closed by non perforated part of the rotor 61. When the inner space 64 is vacuumed, the stretchible tube 63 is removed from the item A and attracted to the inner surface of the rotor 61 so that the item A is released. Before it happens the rod 57 (FIG. 4) which is secured to the crosshead 35 switches the valve 33 in the position shown on FIG. 2 and the cams 36 and 34 form, close and separated ends of the items.

Figure 3:
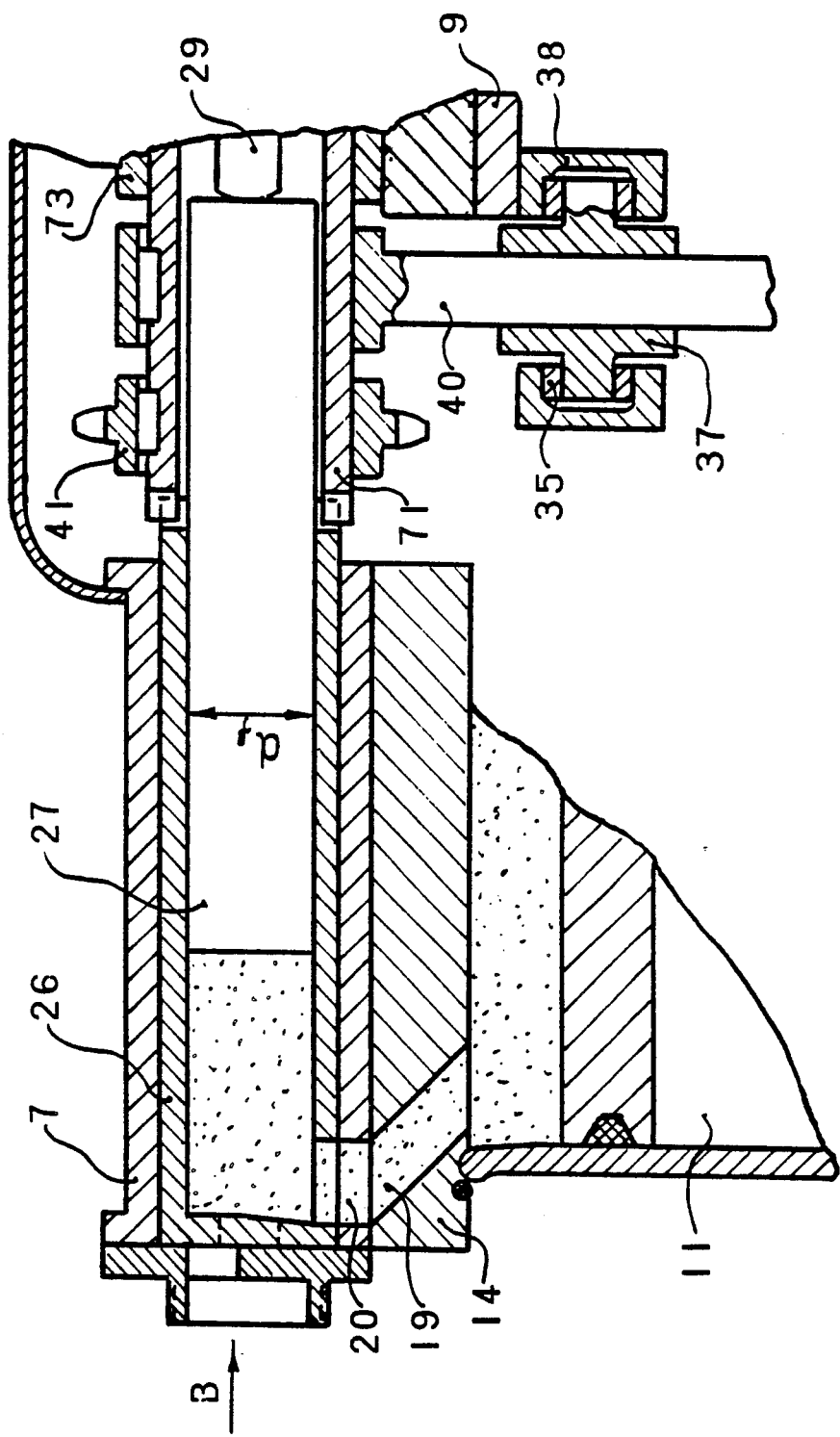
FIG. 3 is a partial sectional view of the measuring device for filling.
Figure 4:
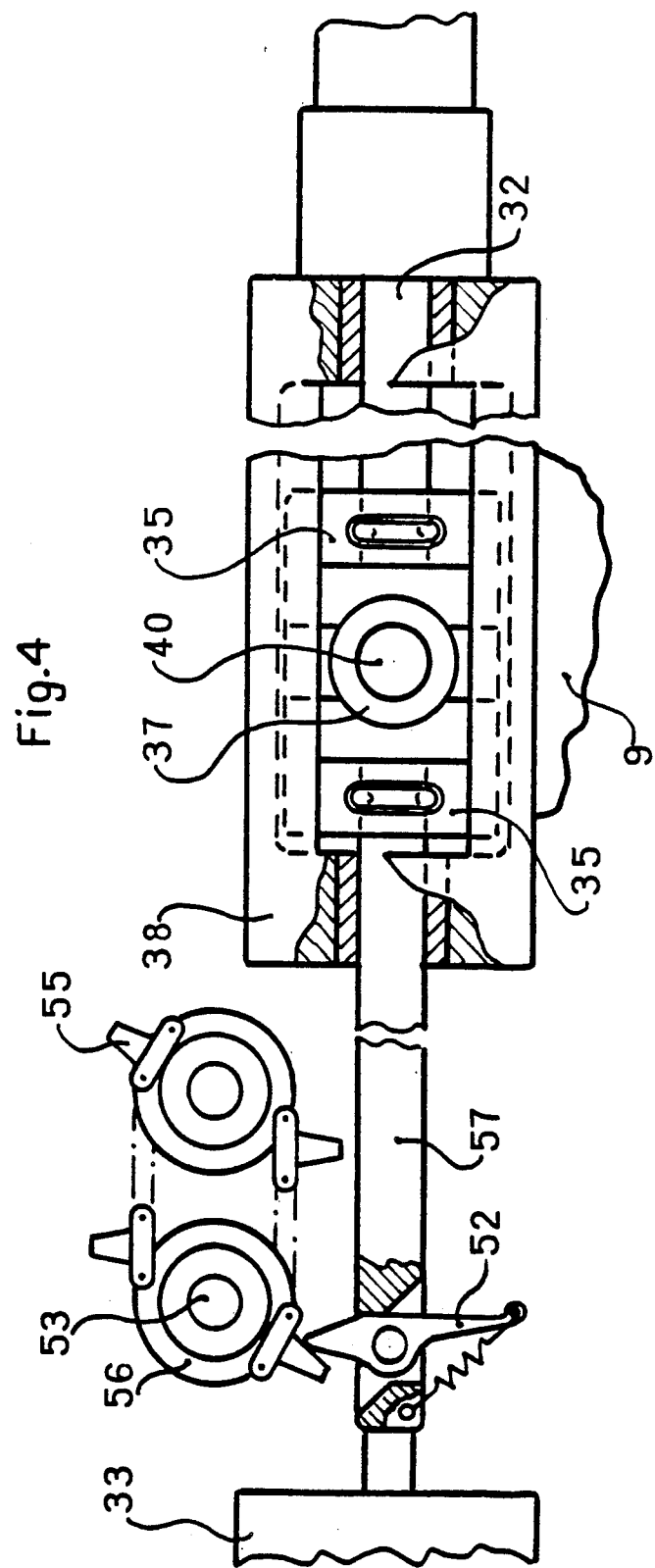
FIG. 4 is a top view of mechanisms for turning of measuring cylinders and controling of the twisting device.
Figure 8:
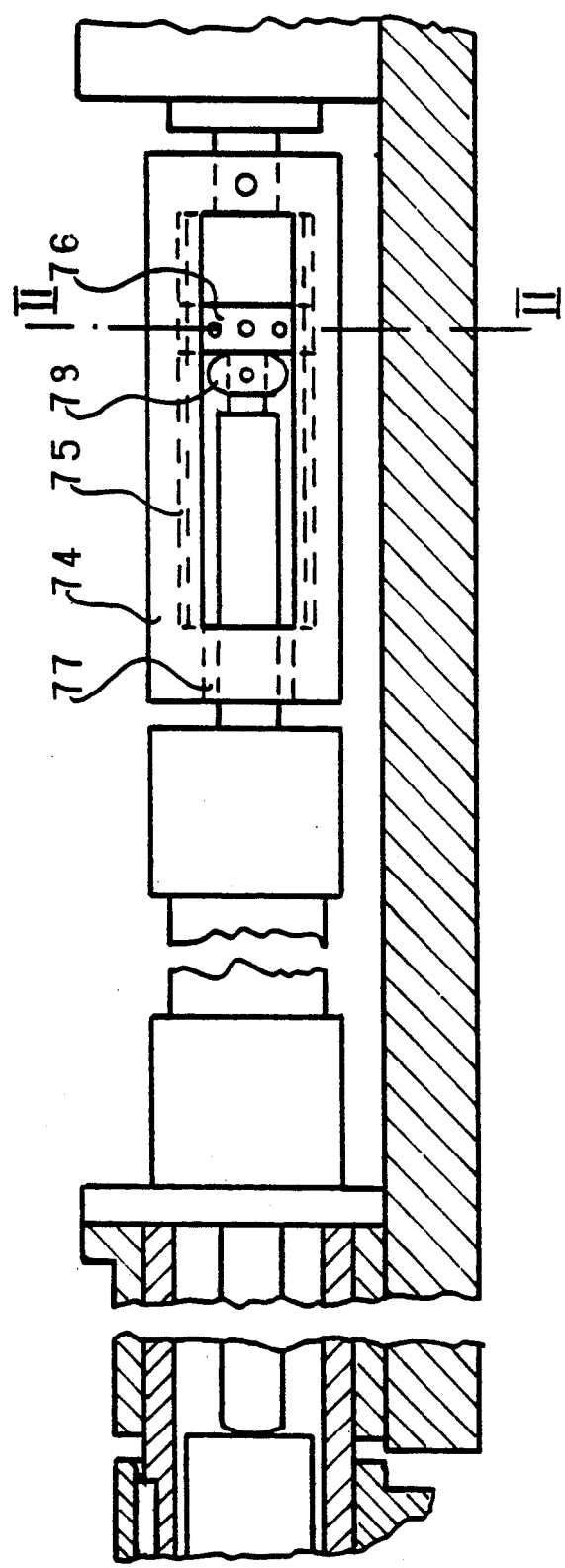
FIG. 8 is a partial sectional view of a mechanism for controling of a piston of the measuring device for a filling.
Figure 9:
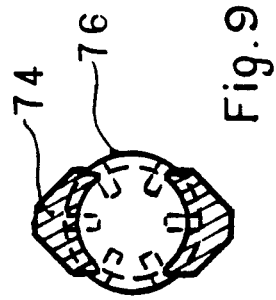
FIG. 9 is a cross sectional view along the line II II FIG. 8.
Figure 10:
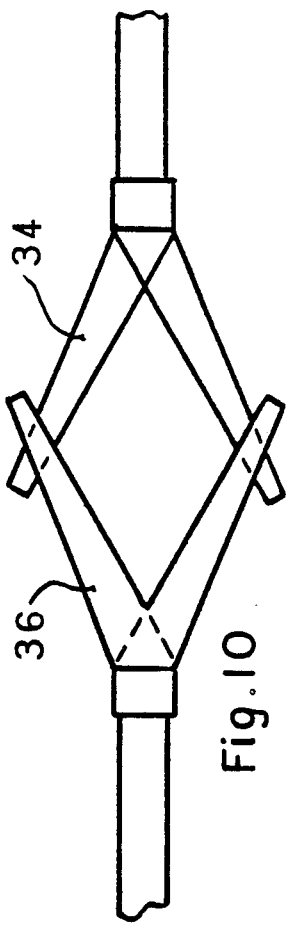
FIG. 10 is a top view of a pinching cams.

In order to simultaneously extrude external dough with internal filling, it must be observed following relationships (FIGS. 3 and 7)

$$\frac{4D \cdot \delta}{(D - \delta)^2} = \frac{d_d^2}{d_f^2}$$

here:

$$D = D_e - \delta$$

wherein:

$D_e$ is the external diameter of the open area of the dough outlet of the die head.

$\delta$ is the thickness of the open area of the dough outlet of the die head, $d_d$—diameter of the plunger 22, $d_f$—diameter of the plunger 27.

Longitudinal dimensions of the item A are adjusted by dose controllers 25 and 30 (FIGS. 2, 8 and 9) which include the frames 74 with internal thread 75, the nuts 76. The frames 74 are secured to stems of valves 23 and 28. The right ends of rods 24 and 29 pass through plain bearings 77 and have heads 78. Disposed distance between the head 78 and the nut 76 in the dose controller 25 (when the rod 24 is in extreme left position) correspond to portion of dough tube for one item. Disposed distance between the head 78 and the nut 76 in the dose controller 30 (when the rod 29 is in extreme left position) correspond to portion of filling for one item.

The invention is not limited to the details shown since various modifications and structural changes are possible without departing from the spirit of the present invention.

What is desired to be protected by letters patent is set forth in particular in the appended claims.

What I claim is:

1. An apparatus for forming filled dough products comprising means for pumping dough and filling to measuring devices; said measuring devices intermittently extruding a predetermined quantity of dough and filling through an extrusion die head; said extrusion die having an outer conduit means connected to an outlet of said dough measuring device by a dough inlet of said die head and an inner conduit means inside of said outer conduit means connected to an outlet of said filling measuring device by a filling inlet of said die head; a pinching device located downstream of said die head for forming, closing and separating two adjacent ends of two adjacent product items; a twisting device located downstream of said pinching device for turning a just extruded item around an axis of extrusion; and a control system for controlling said means for pumping dough and filling, said measuring devices, said pinching device and said twisting device; wherein said measuring devices are plunger extruders having synchronized plungers movable along a longitudinal axis of rotary measuring cylinders; said rotary measuring cylinders being rotatable about said longitudinal axis.

2. An apparatus of claim 1, wherein said twisting device comprises a tubular swelling member having an inner space and means for distributing the air into and out of said inner space, wherein said swelling member is secured to a rotor of a hydraulic actuator and said distributing means is arranged so that when pistons of said actuator are in extreme positions said inner space is connected to a source of vacuum but when said pistons of said actuator are in an intermediate position said inner space is connected to a source of air pressure.

3. An apparatus of claim 1, wherein the diameter $d_d$ of said plunger of said dough measuring device, the diameter $d_f$ of said plunger of said filling measuring device, the external diameter $D_e$ of the dough outer conduit means of said die head and the thickness $\delta$ of an open area formed between said outer conduit means and said inner conduit means are observed by the following relationships:

$$\frac{4 \cdot D \cdot \delta}{(D - \delta)^2} = \frac{d_d^2}{d_f^2}.$$

wherein: $D = D_e - \delta$.

4. An apparatus of claim 1 wherein said means for pumping dough and filling includes two pistons; said pinching device having two hydraulic cylinders with synchronized pistons moving radial to said axis of extrusion; each piston having a pinching cam on its discharged end; said twisting device having a hydraulic actuator drive; and said control system controlling said pistons of said means for pumping dough and filling, the plungers and rotary cylinders of said measuring devices, the pinching device pistons and the hydraulic actuator drive by hydraulic directional control valves.

5. An apparatus of claim 1, wherein said means for pumping dough and filling to said measuring devices comprise a piston feeder for dough connected at its outlet to the inlet of said measuring device for dough and a piston feeder for filling connected at its outlet to the inlet of said measuring device for filling, and said piston feeders having easily replaceable product cylinders.

* * * * *